United States Patent [19]

Frost et al.

[11] 4,210,238
[45] Jul. 1, 1980

[54] CHAIN BRACKET WITH STRENGTHENED CHAIN SUPPORTS

[75] Inventors: Charles C. Frost; Gerald W. Gurney, both of Ada; Frederick R. Sytsma, Grand Rapids, all of Mich.

[73] Assignee: C. L. Frost & Son, Inc., Grand Rapids, Mich.

[21] Appl. No.: 872,245

[22] Filed: Jan. 25, 1978

[51] Int. Cl.² .................... B65G 17/30; B65G 17/80
[52] U.S. Cl. .................................. 198/687; 104/95; 105/154; 198/685; 248/317
[58] Field of Search .................. 104/89, 91, 94, 95, 104/172 S, 93; 198/477, 683, 684, 685, 687; 105/148, 154, 155, 150; 248/300, 317, 323, 340; 16/90, 94 R; 29/150

[56] References Cited

U.S. PATENT DOCUMENTS

| | | | |
|---|---|---|---|
| 625,427 | 5/1899 | Stewart et al. | 29/150 |
| 1,702,803 | 2/1929 | Webb . | |
| 1,721,316 | 7/1929 | Pribil . | |
| 1,721,759 | 7/1929 | Webb . | |
| 1,806,913 | 5/1931 | Paquette . | |
| 1,906,097 | 4/1933 | Pribil | 198/687 |
| 2,075,261 | 3/1937 | Bishop . | |
| 2,095,022 | 10/1937 | Bishop . | |
| 2,101,951 | 12/1937 | McInnis . | |
| 2,133,391 | 10/1938 | Lemmon . | |
| 2,242,065 | 5/1941 | Gaboury . | |
| 2,265,248 | 12/1941 | Pomeroy . | |
| 2,283,359 | 5/1942 | Gaboury . | |
| 2,398,062 | 4/1946 | Webb et al. . | |
| 2,411,906 | 12/1946 | Suman . | |
| 2,517,652 | 8/1950 | Gaboury . | |
| 2,552,897 | 5/1951 | Lemmon . | |
| 2,644,571 | 7/1953 | Webb et al. . | |
| 2,780,178 | 2/1957 | Zebley | 105/148 |
| 2,816,643 | 12/1957 | Klamp . | |
| 2,830,694 | 4/1958 | Zebarth . | |
| 2,853,955 | 9/1958 | Bishop et al. . | |
| 2,892,419 | 6/1959 | King | 105/155 |
| 2,931,486 | 4/1960 | Zebarth . | |
| 2,956,514 | 10/1960 | Bishop . | |
| 3,231,067 | 1/1966 | Gaboury et al. . | |
| 3,268,062 | 8/1966 | Gladstone . | |
| 3,420,188 | 1/1969 | Dehne et al. | 104/172 S |
| 3,777,872 | 12/1973 | Rikman et al. . | |
| 3,854,573 | 12/1974 | Freier, Sr. | 104/172 S X |
| 3,971,601 | 7/1976 | Sytsma | 104/95 X |

FOREIGN PATENT DOCUMENTS

| | | |
|---|---|---|
| 1370208 | 7/1963 | France . |
| 304124 | 3/1955 | Switzerland . |
| 617534 | 2/1949 | United Kingdom . |
| 706349 | 3/1954 | United Kingdom . |
| 708935 | 5/1954 | United Kingdom . |
| 1025022 | 4/1966 | United Kingdom . |
| 1180133 | 2/1970 | United Kingdom . |
| 1466703 | 3/1977 | United Kingdom . |
| 438589 | 1/1975 | U.S.S.R. . |

OTHER PUBLICATIONS

"Conveyors", A. B. Farquhar Division of Conveyor Systems, Inc.
"Ball Bearing Trolleys", Link-Belt Material Handling Systems Division, FMC Corporation, 1972.
"Frost Food Handling Products", C. L. Frost & Son, Inc., 1975.

Primary Examiner—Randolph A. Reese
Attorney, Agent, or Firm—Price, Heneveld, Huizenga & Cooper

[57] ABSTRACT

An improved chain bracket, and especially a trolley bracket assembly for use with conveyor chains in overhead conveyor systems. The bracket and assembly parts are economically stamped from sheet metal and include strengthened, reinforced chain link supports or pads which resist bending and wear when under load. In one embodiment, the chain pads extend from one of either the chain bracket or a separate bracket attachment while the reinforcing member extends from the other of the chain bracket or bracket attachment. In another embodiment, the reinforcing portion extends generally in a plane perpendicular to both the chain pad and to the planar bracket portion from which the pad is formed. In this latter case, the reinforcing member may be either integral and in one piece with the chain bracket and pad or extend separately from the bracket attachment.

34 Claims, 12 Drawing Figures

CHAIN BRACKET WITH STRENGTHENED CHAIN SUPPORTS

BACKGROUND OF THE INVENTION

This invention relates to chain brackets, and especially to trolley brackets for supporting loads in overhead conveyor systems, which brackets are connected to conveyor chains, and, more particularly, to an improved chain or trolley bracket and a chain or trolley bracket assembly which are more economical to manufacture because they are stamped from sheet metal and have increased chain support strength.

Trolley and other chain brackets used in overhead conveyor systems are typically subjected to many stresses and strains. In the typical manufacturing plant utilizing an overhead conveyor, the conveyor includes numerous horizontal corners as well as changes in vertical height along its length. Each trolley bracket, which is typically supported by a wheel assembly on an overhead I-beam type or other type conveyor rail or the like, is joined to a conveyor chain which extends along the conveyor rail by means of one of the chain links. A typical method is to insert a pair of trolley brackets through the open center of the link in back to back fashion and thereafter move the brackets outwardly with a spacer and secure them with bolts or the like to hold the link in place on the brackets. Other chain brackets, such as those typically fitted between trolley brackets, are also secured to the chain in a similar fashion.

When each combination of brackets and a chain link encounters turns in the conveyor and especially vertical changes in height, the chain changes direction urging the bracket connected links through that same change in direction. This tends to cause the rigidly mounted links to "rock" on the brackets resulting in wear to or deformation of the chain and brackets.

One prior known type of trolley bracket was forged from steel or another metal. The forging method is tremendously more expensive because it is labor intensive and requires numerous forging dies. Such dies tend to wear out quickly because of extensive configurations and projections in the trolley bracket to be formed. A forged bracket also includes metal which has to be softened by heating to allow forging, is heavier than a stamped sheet metal bracket, is more expensive to heat treat for hardness after forging, and requires secondary machining before use.

Other prior trolley and chain brackets were stamped from sheet metal. Some of these brackets included chain support surfaces which were bent out of the sheet metal itself. Such chain supports often bent and were deformed when stressed during use on a conveyor and subjected to the above "rocking" link motion. In addition, some of the prior stamped trolley and chain brackets supported the chain only with sheared edges of the stamped metal itself which increased wear on the chain.

Accordingly, a need was evident for an economical chain bracket or chain bracket assembly, and especially a trolley bracket or trolley bracket assembly for use with overhead conveyors which would be stronger and more durable in use, could be more easily and economically heat treated for hardness after formation, and which would include better chain supports which would remain in their proper position and resist wear even under stress and load during use.

This invention provides a solution to the above problems. Other, distinct strengthened trolley brackets are disclosed in copending, commonly assigned, U.S. patent applications, Ser. No. 872,244, invented by Charles C. Frost and Siegfried K. Weis and Ser. No. 872,265 invented by Gerald W. Gurney and Siegfried K. Weis, both of which were filed on even date herewith.

SUMMARY OF THE INVENTION

Accordingly, the present invention provides an improved chain bracket or chain bracket assembly, and especially a trolley bracket or trolley bracket assembly for use with overhead conveyors, which bracket and assembly are adapted to be formed from sheet metal providing a more economical, yet strengthened bracket or assembly. The present invention uses a chain support or pad as well as a reinforcing portion for such pad which is either bent from the sheet metal of the bracket itself or it is bent from the sheet metal of a bracket attachment adapted to be secured to the bracket to form an assembly. The reinforcing portion prevents the pad from bending out of its preferred position even when stressed and loaded during use. In addition, principle support for or engagement with the chain adapted to be connected to the bracket or assembly is provided by smooth, uncut surfaces of the sheet metal so that primary support by edges of the metal which could cause greater wear on the chain is avoided. The formed sheet metal parts may be heat treated after formation for increased hardness and further resistance to wear.

In one form, the invention provides a trolley bracket assembly for use in overhead conveyors comprising a trolley bracket and a bracket attachment for spacing a pair of the brackets apart when assembled in an overhead conveyor. The bracket includes a first end portion having means for supporting a trolley wheel thereon, a second end portion opposite the first end, and an intermediate portion connecting the first and second ends. The bracket is elongated along a line extending between the ends. One of the trolley bracket and bracket attachment includes at least one chain pad extending generally transverse to the direction of elongation of the bracket and outwardly of the second end portion on the bracket while the other of the bracket and bracket attachment include reinforcement means for the chain pad. The reinforcement means extend into abutment with the chain pad for supporting the chain pad and preventing its movement under load. Means are also provided for securing the bracket attachment to the bracket.

In other forms, the invention may be a bracket for attachment to a chain and assembly with a bracket attachment including a chain pad or reinforcement means as set forth herein.

In another form, the invention provides an improved trolley or chain bracket formed from sheet metal and having a generally planar portion intermediate its side edges. The bracket includes at least one chain pad extending transverse to the direction of elongation of the bracket and outwardly of the planar intermediate portion. The chain pad has a chain link support surface which is generally perpendicular to the planar bracket portion for supporting a chain link when mounted on the bracket. A generally planar reinforcing member supports a portion of the chain pad at a position which is spaced inwardly of the side edges of the bracket, the reinforcing member being located in a plane which is generally perpendicular to the plane of the planar bracket portion and extends away from the chain link support surface such that the chain pad is prevented from being bent out of its support position under load. In this form the reinforcing member may be formed in one piece with the bracket or on the separate bracket attachment.

In other aspects, the reinforcing or chain pad portions extending from the bracket attachment may extend through openings or apertures adjacent the chain pad or reinforcing portions formed on the bracket itself or may extend around and over edges of the bracket into abutment with the chain pad or reinforcement member.

These and other objects, advantages, purposes and features of the invention will become more apparent from a study of the following description taken in conjunction with the drawings.

DESCRIPTION OF THE PREFERRED EMBODIMENTS

Figure 1:
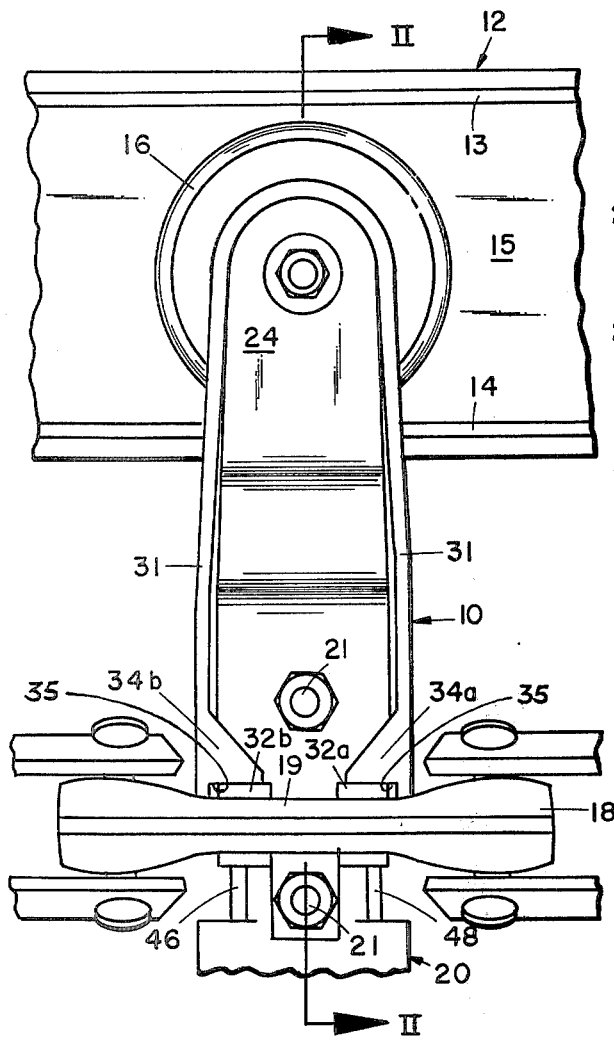
FIG. 1 is a fragmentary, front elevation of an overhead conveyor including a trolley bracket assembly of the present invention.
Figure 2:
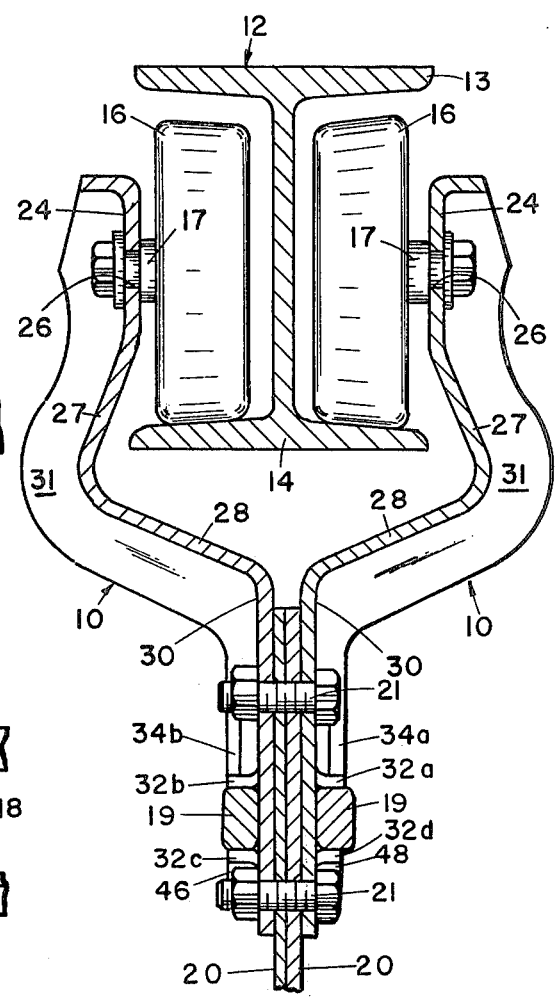
FIG. 2 is a fragmentary, sectional side elevation of the trolley bracket assembly in an overhead conveyor taken along plane II—II of FIG. 1.

Referring now to the drawings in greater detail, FIGS. 1 and 2 illustrate one embodiment of the improved, strengthened, reinforced trolley bracket 10 of the present invention assembled in a typical, overhead conveyor system. The overhead conveyor system includes an I-beam-type overhead support rail 12. Beam 12 includes upper and lower, laterally extending flanges 13, 14 connected by a central wall or vertical flange 15. Lower flange 14 supports one trolley wheel assembly 16 on either side of central wall 15, each wheel assembly 16 including a laterally outwardly extending axle 17 bolted to the upper end of one of the improved trolley brackets 10 of the present invention. The brackets themselves extend downwardly and curve inwardly around flange 14 to a position adjacent one another for receipt of a link from the conveyor chain which moves the brackets and wheel assemblies along the rail 12.

Each pair of brackets 10 is received through the center opening of the central chain link 18 which has parallel side portions 19. Side portions 19 are supported and prevented from moving vertically or in a "rocking" motion by a plurality of chain pads formed in the lower end of the brackets as will be more fully described hereinafter.

The bracket lower ends are individually inserted through the central opening in the chain link 18 and moved outwardly to engage side portions 19 after which central spacers or bracket attachments 20 are inserted between the trolley brackets 10 and securing bolts 21 are passed through the aligned apertures in the brackets and bracket attachments to secure the entire assembly in place. As is best seen in FIG. 2, the spacer or bracket attachments 20 extend downwwardly beyond the lower ends of the bracket and may include an additional aperture or other means for suspending a shackle, support, hanger or the like to support an object on the conveyor.

Figure 3:
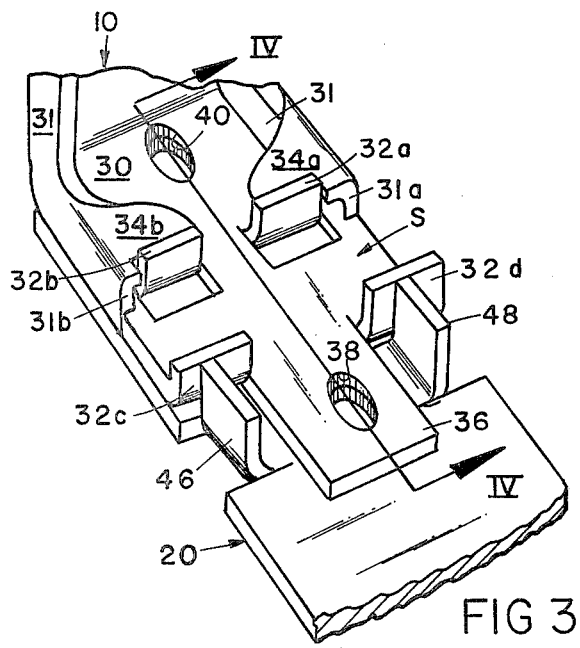
FIG. 3 is a fragmentary, perspective view of the trolley bracket assembly of FIGS. 1 and 2.
Figure 4:
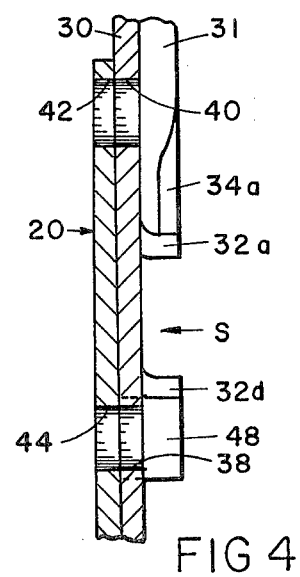
FIG. 4 is a fragmentary, sectional side elevation of the trolley bracket assembly taken along plane IV—IV of FIG. 3.

As is best seen in FIGS. 3 and 4, one of the brackets 10 and bracket attachments 20 together form a trolley bracket assembly unique in the present invention. Bracket 10 is a continuous, elongated, single piece stamped from sheet steel, sheet stainless steel or other metal typically having a thickness of approximately 0.125 inches. The designed thickness of the sheet metal can be increased or decreased depending on the load required to be supported by the brackets. Each bracket 10 includes a first or upper end 24 having an aperture 26 centered therein for receiving the axle 17 of one of the wheel assemblies 16 as shown in FIGS. 1 and 2. The upper end angles slightly outwardly at 27 around the lower flange 14 of rail 12 and merges with a connecting portion 28 extending downwardly and inwardly from the lower end of the upper portion. Connecting portion 28 merges with a continuous, downwardly extending lower or second end 30 which is generally planar between its side edges and extends generally parallel to the portion of the upper end 24 which includes aperture 26.

Each bracket 10 also includes an upstanding, marginal edge flange 31 extending continuously along the peripheral edges of the bracket except for relieved areas aligned with one another transversely across the bracket lower end 30 to provide a space S for receiving one side portion 19 of a chain center link 18. Space S is slightly wider than the width of one side portion 19. Flanges 31 provide strength and rigidity for the formed bracket and are bent and formed in one piece with the remainder of the bracket by stamping.

Support for the chain link sides 19 is provided by four spaced, aligned, chain pads or supports 32a, 32b, 32c and 32d in bracket 10. Pads 32 are formed in one piece and bent from the planar center area of the lower end 30. Each chain pad extends upwardly, generally perpendicularly to the planar center area of the lower end 30 and has a generally planar chain link-engaging surface facing the space S where the link is received. The chain link-engaging surface is formed from the planar, smooth surface of the sheet metal to avoid, to as great an extent as possible, contact of the link portions with cut metal portions of the bracket to reduce wear and abrasion.

For the upper two chain support pads 32a, 32b, reinforcing support for the pads to prevent their bending when under stress and load in use is provided by reinforcing members or portions 34a, 34b which extend inwardly behind each of the chain pads from the adjacent marginal edge flanges 31. Reinforcing members 34 are formed in one piece and bent from the bracket sheet metal and, more particularly, from the marginal edge flanges, such that they are parallel planar bracket portion 30 but are spaced above that bracket portion adjacent the free ends of the chain pads 32a and 32b. The end edges 31a, 31b of the marginal edge flanges, which help define the link space S are flush with the chain engaging surfaces of the chain pads 32a and 32b to provide additional support for the chain links. Even though surfaces 31a, 31b are cut surfaces of the sheet metal, their flush extension with the pads 32 prevents them from unduly wearing the chain. Each reinforcing member or portion 34a, 34b also includes a notch or recess 35 having a width equal to the thickness of the chain pad. The edge of recess 35 in each reinforcing member has a thickness equal to that of the sheet metal and abuts the rear surface of the chain pad opposite to the chain engaging surface along a major portion of the length of the pad. The chain pad surfaces extend transversely across the bracket generally perpendicular to the direction of elongation of the bracket and are aligned with opposing and adjacent pads to provide secure support for the sides 19 of the chain center link portion 18. Bent reinforcing members 34a, 34b are of the type disclosed in copending, commonly assigned United States patent application Ser. No. 872,244, invented by Charles C. Frost and Siegfried K. Weis and filed on even date herewith but form no part of the invention of the present application.

The lower chains support pads 32c, 32d are also bent in one piece and formed from the sheet metal of the lower bracket portion 30 and extend perpendicular to that bracket portion but transverse to the direction of elongation of the bracket adjacent each lateral side edge of the bracket. A central flange 36 extends downwardly between and beyond the chain support pads 32c, 32d and includes a securing aperture 38 therein. A second securing aperture 40, aligned with aperture 38 along the center line of the bracket is provided in the upper part of the lower bracket portion 30 as best seen in FIG. 3.

Support for lower chain pads 32c, 32d is provided by the bracket attachment 20 which is secured to the bracket 10 via a pair of aligned holes 42, 44 as shown in FIG. 4. The reinforcing portions of bracket attachment 20 include upstanding reinforcement members or projections 46, 48 one abutting the rear surface of each of the chain pads 32c, 32d. Reinforcing or abutment members 46, 48 are bent out of the plane of the sheet metal of bracket attachment 20 such that they extend in a general plane which is parallel to the direction of elongation of the bracket 10, are perpendicular to both the lower bracket portion 30 and bracket attachment 20, and have an edge comprising the thickness of the planar sheet metal engaging the rear surface of chain support pads 32c, 32d along a generally rectilinear line spaced inwardly from the side edges of the bracket so that pads 32c, 32d will not bend under load. Supports 46, 48 extend upwardly adjacent the rear surfaces of the chain pads in the openings from which the pads were originally bent (FIG. 3).

Figure 5:
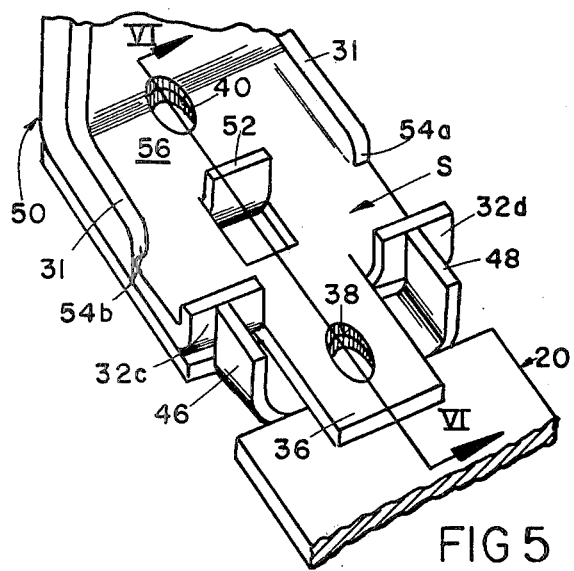
FIG. 5 is a fragmentary, perspective view of a second embodiment of the improved trolley bracket assembly of the present invention.
Figure 6:
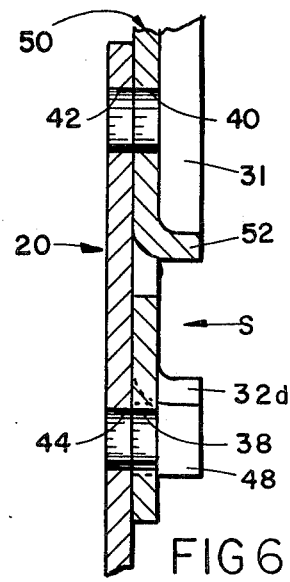
FIG. 6 is a fragmentary, sectional side elevation of the assembly of FIG. 5 taken along plane VI—VI of FIG. 5.

FIGS. 5 and 6 illustrate another embodiment 50 of the improved trolley bracket assembled with a bracket attachment 20 exactly similar to that shown in FIGS. 1-4. In FIGS. 5 and 6, like numerals indicate like parts to those shown in FIGS. 1-4. Bracket 50 differs from bracket 10 in that it includes but a single chain pad or support 52 centered intermediate the marginal edge flanges 31 on the edges of the bracket. The end edges 54a, 54b of the marginal edge flanges 31 extend generally perpendicular to the planar lower bracket portion 56 of bracket 50 and are aligned with the chain link-engaging surface of chain pad 52 which is also perpendicular to the bracket portion 56. Pad 52 is lanced and bent outwardly from the sheet metal of the bracket portion 56. Thus, edges 54a, 54b, and chain pad 52 support the upper portion of the chain link when mounted on the bracket while aligned chain pads 32c, 32d support the lower side of the chain link in the manner described above in connection with FIGS. 1-4. Bracket 20 is secured to the bracket 15 in exactly the same manner as described in connection with FIGS. 1-4 and supports 46, 48 reinforce pads 32c, 32d in the same manner. The open space between lower chain support pads 32c, 32d provides room for receipt of a nut or bolt head for fastening the bracket and attachment together.

Figure 7:
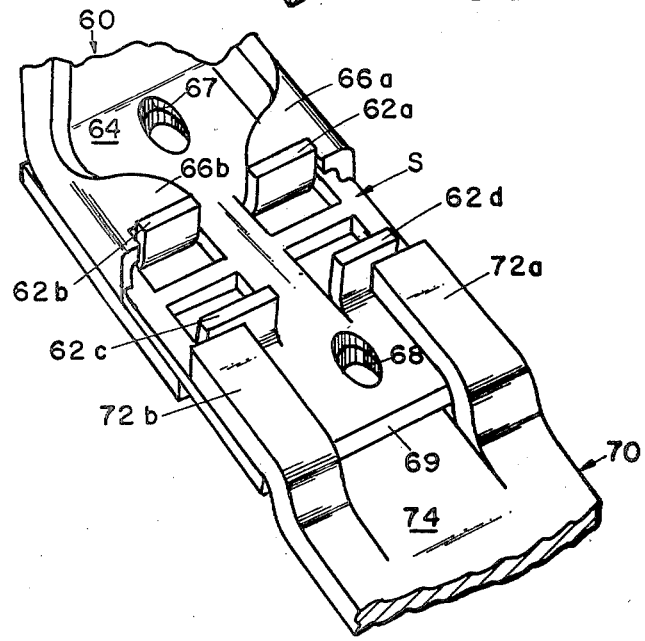
FIG. 7 is a fragmentary, perspective view of a third embodiment of the trolley bracket assembly of the present invention.
Figure 8:
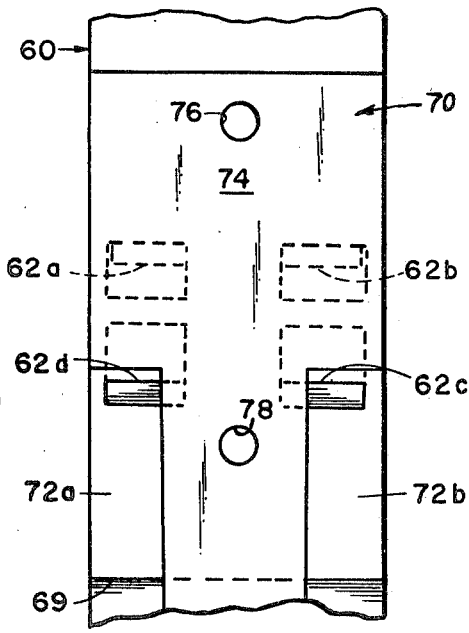
FIG. 8 is a fragmentary, rear elevation of the assembly shown in FIG. 7.

As shown in FIGS. 7 and 8, a third embodiment of the reinforced trolley bracket assembly is shown including bracket 60 including four chain support pads 62a, 62b, 62c and 62d bent upwardly from the planar sheet metal of lower bracket portion 64. Upper chain support pads 62 are supported by reinforcing portions 66a, 66b respectively, bent inwardly from the marginal edge flanges 31 in the same manner as described in connection with FIGS. 1-4 above. Lower chain support pads 62c, 62d, which are aligned with one another and with pads 62b, 62a, respectively, and spaced apart to define link-receiving space S, are also bent outwardly from the planar sheet metal of the lower bracket portion 64.

Pads 62c, 62d are supported and reinforced by elongated, reinforcing members 72a, 72b of bracket attachment 70 so that the chain pads will not bend or deform under load. Bracket attachment 70 is a generally planar member stamped from sheet metal and includes a central bar 74 extending behind bracket 60 and including apertures 76, 78 (FIG. 8) aligned with apertures 67, 68 of bracket 60 along the center line of the bracket so that securing bolts or other fasteners may be passed through the apertures to secure the members together. Reinforcing members 72 are stamped and offset from the edges of a portion of bracket attachment 70 which is of equal width to bracket 60. They are offset by a distance slightly greater than the thickness of the sheet metal of bracket 60 and extend upwardly and over the lower edge 69 of bracket 60 into abutment with the rear surface of pads 62c, 62d. Reinforcement members 72 extend parallel to the direction of elongation of the bracket and are generally parallel to the lower bracket portion 64 and perpendicular to the chain support surface of those pads. In addition, the end surfaces of reinforcing members 72, which extend transversely to the direction of elongation of members 72 and to the direction of elongation of the bracket, engage more than half of the rear surface of the chain pads to provide secure support against bending of those pads from the outer areas of those pads.

Figure 9:
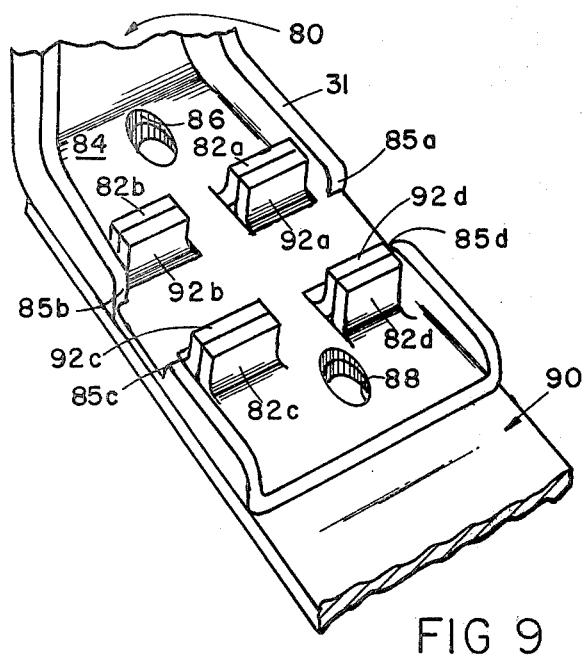
FIG. 9 is a fragmentary, perspective view of a fourth embodiment of the improved trolley bracket assembly of the present invention.
Figure 10:
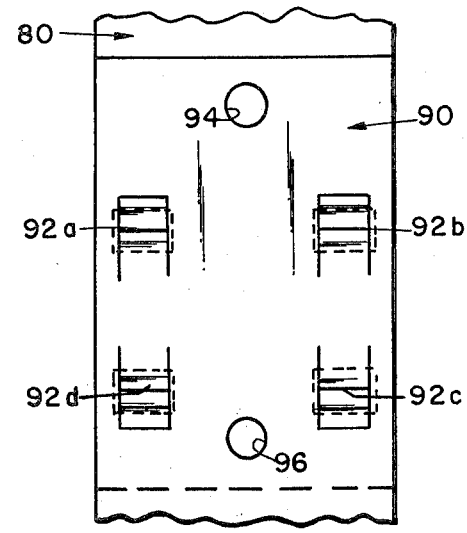
FIG. 10 is a fragmentary, rear elevation of the assembly shown in FIG. 9.

As shown in FIGS. 9 and 10, a fourth embodiment of the improved trolley bracket assembly is designed for use with two-part chain links which can be assembled around the bracket assembly. In this embodiment, upstanding reinforcement members 82a, 82b, 82c and 82d are lanced and bent outwardly from the sheet metal of planar lower bracket portion 84 intermediate marginal side edge flanges 31 and provide openings on the chain receiving sides of those reinforcing members. A bracket attachment 90 is secured and positioned behind bracket 80 and includes lanced and bent chain pads 92a, 92b, 92c and 92d extending generally perpendicularly to the bracket attachment and outwardly through the openings adjacent reinforcing members 82. Chain pads 92 are slightly longer than reinforcing members 82 so that their outer end edges are flush and are parallel to and abut one another and extend generally transversely across the bracket 80 and bracket attachment 90 as illustrated. Other than the slightly greater length of pads 92 to accommodate the thickness of bracket 80, pads 92 and reinforcements 82 are of substantially equivalent size. Aligned apertures along the center line of the bracket and bracket attachment 86, 88 and 94, 96, respectively, are provided to secure the parts together in a manner similar to that described with the other embodiments above. When assembled, the chain link-engaging surfaces of chain pads 92 are flush with the end edges 85a, 85b, 85c and 85d of marginal edge flanges 31 which define the chain link-receiving space S as shown in FIG. 9. Since the support pads and reinforcing members are bent oppositely from their planar sheet metal bracket 80 or bracket attachment 90 as shown in FIG. 9, and are co-extensive with one another, secure support for the link is provided which resists bending and deformation during use.

Bracket 80 and attachment 90 are designed for use with links which can be assembled around the previously assembled bracket and attachments 80 and 90. Inasmuch as chain support pads 92 are too long to be inserted through the openings adjacent reinforcing members 82 after a pair of the brackets has been inserted through a closed center link of the type shown in FIGS. 1 and 2 because of the lack of space, bracket 80 must be previously assembled with attachment 90 and a link assembled therearound after such assembly.

Figure 11:
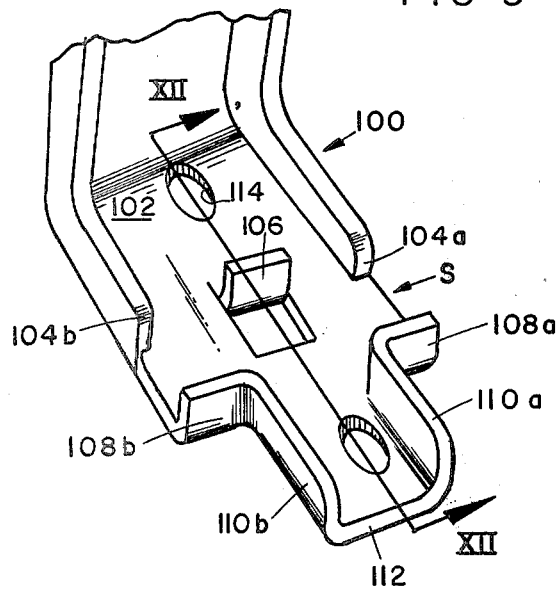
FIG. 11 is another embodiment of the improved trolley bracket of the present invention including reinforcing members perpendicular to the bracket itself and supporting portions of the chain pad spaced inwardly from the edges of the bracket wherein the reinforcing members are formed from the sheet metal of the bracket.
Figure 12:
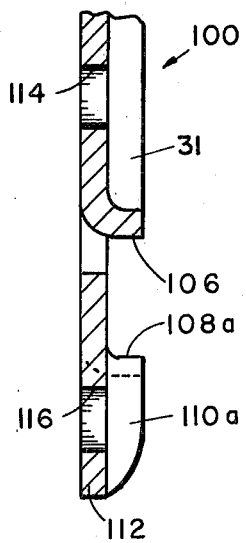
FIG. 12 is a fragmentary, sectional side view of the trolley bracket of FIG. 11 taken along plane XII—XII of FIG. 11.

As shown in FIGS. 11 and 12, an improved trolley bracket embodiment 100 stamped from a single piece of planar sheet metal is shown. Bracket 100 is of similar shape to the brackets 10 shown in FIGS. 1 and 2 and includes a generally planar lower bracket portion 102. Marginal side edge flanges 31 include aligned end surfaces 104a, 104b which are aligned with a parallel chain link-engaging surface of upper chain support pad 106. Pad 106 is lanced and bent perpendicularly outwardly from the planar bracket portion 102. These three surfaces define the support for the upper side of the chain link. The lower side of the chain link is supported by a pair of lower chain support pads 108a, 108b each of which includes an integral, continuous reinforcing member 110a, 110b respectively, stamped and bent in one piece with the lower chain supports from the material of the bracket. Reinforcing portions 110 each lie in planes which are generally perpendicular to the bracket portion 102 as well as to the transversely extending chain link supporting surfaces of chain supports 108 which face the link support space S. The reinforcing members extend from the inner edges of chain supports 108 and extend continuously therewith and merge with bracket portion 102 and the lower end edge 112 of the bracket 100. Apertures 114, 116 are provided along the center line of the bracket for securing the bracket to spacers or bracket attachments and other brackets in a manner similar to that shown in FIGS. 1 and 2. Thus, the reinforcing members 110 support and resist bending and deformation of the lower chain pads 108 even though they engage only the inner edges of those chain support pads due to their integral formation from the sheet metal of the bracket itself.

Accordingly, the bracket and bracket attachment embodiments shown in FIGS. 1–10 provide reinforcing support for the chain pads regardless of whether the chain pads are formed on the bracket or on the bracket attachment. The reinforcing members are formed on the element on which the chain pads are not formed. Such reinforcing members can extend either parallel to or perpendicular to the brackets and either parallel to or perpendiculadr to the chain pads themselves and still achieve the desired deformation preventing function during use. The bracket embodiment shown in FIGS. 11 and 12 provides reinforced chain pads which function similarly to those in FIGS. 1–6. In this case, the reinforcing members extend perpendicularly to both the chain link-engaging surfaces of the chain pad as well as to the lower bracket portion from which the chain pads extend. In this case, the perpendicularly extending reinforcing portions are spaced inwardly from the outer side edges of the chain pads and provide secure and adequate support against deformation even though only one portion of the chain pad is engaged or supported.

Preferably, sheet steel is used for the brackets and bracket attachments of this invention. One type found useful is nominal ⅛ inch, low carbon 1010 sheet steel. After stamping and bending, the formed brackets and bracket attachments can be surface hardened by carbarizing which includes heating them to approximately 1500° to 1550° F. in a furnace while inducing carbon into the furnace atmosphere. The carbon enters the metal surfaces for greater hardness. Alternately, higher carbon 1035 sheet steel can be stamped and bent and thereafter surface hardened by heating to approximately 1500° to 1550° F. followed by quenching in an ambient temperature oil bath. Although the above surface hardening steps could also be performed on prior known forged brackets, it was more difficult and expensive to do so than with the present stamped brackets because of the surface configuration of the forged parts.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follows.

The embodiments of the invention in which in exclusive property or privilege is claimed are defined as follows:

1. A trolley bracket assembly for use in overhead conveyors comprising a trolley bracket having a first end portion including means for supporting a trolley wheel thereon, a second end portion opposite said first end, and an intermediate portion connecting said first and second end portions, said bracket being elongaed along a line extending between said first and second end portions; a bracket attachment for spacing a pair of said brackets apart when assembled in an overhead conveyor; one of said trolley bracket and bracket attachment including at least one chain pad having at least one chain link engaging surface extending generally transverse to said direction of elongation of said bracket and outwardly of said second end portion on said bracket; the other of said trolley bracket and bracket attachment including reinforcement means extending into abutment with a portion of said chain pad opposite to said chain link engaging surface for supporting said chain pad and preventing its movement under load; and means for securing said bracket attachment to said bracket.

2. The trolley bracket assembly of claim 1 wherein said second end portion of said trolley bracket includes said chain pad; said bracket attachment including said reinforcing means.

3. The trolley bracket assembly of claim 2 wherein said second end portion of said trolley bracket includes a generally planar portion; said reinforcing means including a reinforcing member extending generally perpendicularly to said generally planar portion of said second end portion of said bracket.

4. The trolley bracket assembly of claim 3 wherein said bracket attachment is stamped from generally planar sheet metal, said reinforcing member being bent out of the plane of said sheet metal and engaging said chain pad.

5. The trolley bracket assembly of claim 4 wherein said reinforcing member extends perpendicularly to said chain pad.

6. The trolley bracket assembly of claim 2 wherein said bracket attachment is stamped from generally planar sheet metal, said reinforcing means including an elongated, reinforcing member offset from said planar bracket attachment sheet metal by a distance greater than the thickness of said trolley bracket, said reinforcing member being formed in one piece with said bracket attachment and extending over an edge of said trolley bracket into engagement with said chain pad.

7. The trolley bracket assembly of claim 1 including at least a pair of said chain pads having chain link-engaging surfaces aligned with one another; said reinforcing means engaging the sides of said chain pads opposite said chain link-engaging surfaces.

8. The trolley bracket assembly of claim 7 including a second pair of chain pads having chain link-engaging surfaces aligned with one another and facing the chain link-engaging surfaces of said first mentioned pair of chain pads, said first and second pairs of chain pads spaced apart in a direction parallel to the direction of elongation of said trolley bracket and defining a chain link-receiving space therebetween; reinforcing means for supporting said second pair of chain pads extending from one of said trolley bracket and said bracket attachment to prevent said chain pads of said second pair from bending under load.

9. A trolley bracket assembly for use in overhead conveyors comprising a trolley bracket having a first end portion including means for supporting a trolley wheel thereon, a second end portion opposite said first end, and an intermediate portion connecting said first and second end portions, said bracket being elongated along a line extending between said first and second end portions; a bracket attachment for spacing a pair of said brackets apart when assembled in an overhead conveyor; one of said trolley bracket and bracket attachment including at least one chain pad extending generally transverse to said direction of elongation of said bracket and outwardly of said second end portion on said bracket; the other of said trolley bracket and bracket attachment including reinforcement means extending into abutment with said chain pad for supporting said chain pad and preventing its movement under load; and means for securing said bracket attachment to said bracket; said second end portion of said trolley bracket including said chain pad; said bracket attachment including said reinforcing means; said second end portion of said trolley bracket including a generally planar portion; said reinforcing means including a reinforcing member extending generally perpendicularly to said generally planar portion of said second end portion of said bracket; said bracket attachment being stamped from generally planar sheet metal, said reinforcing member being bent out of the plane of said sheet metal and engaging said chain pad; an opening in said trolley bracket adjacent said pad; said reinforcing member extending through said opening and into abutment with said chain pad.

10. A trolley bracket assembly for use in overhead conveyors comprising a trolley bracket having a first end portion including means for supporting a trolley wheel thereon, a second end portion opposite said first end, and an intermediate portion connecting said first and second end portions, said bracket being elongated along a line extending between said first and second end portions; a bracket attachment for spacing a pair of said brackets apart when assembled in an overhead conveyor; one of said trolley bracket and bracket attachment including at least one chain pad extending generally transverse to said direction of elongation of said bracket and outwardly of said second end portion on said bracket; the other of said trolley bracket and bracket attachment including reinforcement means extending into abutment with said chain pad for supporting said chain pad and preventing its movement under load; and means for securing said bracket attachment to said bracket; said second end portion of said trolley bracket including said chain pad; said bracket attachment including said reinforcing means; said bracket attachment being stamped from generally planar sheet metal, said reinforcing means including an elongated, reinforcing member offset from said planar bracket attachment sheet metal by a distance greater than the thickness of said trolley bracket, said reinforcing member being formed in one piece with said bracket attachment and extending over an edge of said trolley bracket into engagement with said chain pad; said chain pad being adjacent the end edge of said second end portion of said trolley bracket; said reinforcing member being parallel to said planar bracket attachment and to the said second end portion of said trolley bracket, perpendicular to said chain pad, and extending over said end edge of said second end portion.

11. A trolley bracket assembly for use in overhead conveyors comprising a trolley bracket having a first end portion including means for supporting a trolley wheel thereon, a second end portion opposite said first end, and an intermediate portion connecting said first and second end portions, said bracket being elongated along a line extending between said first and second end portions; a bracket attachment for spacing a pair of said brackets apart when assembled in an overhead conveyor; one of said trolley bracket and bracket attachment including at least one chain pad extending generally transverse to said direction of elongation of said bracket and outwardly of said second end portion on said bracket; the other of said trolley bracket and bracket attachment including reinforcement means extending into abutment with said chain pad for supporting said chain pad and preventing its movement under load; and means for securing said bracket attachment to said bracket; said bracket attachment including said chain pad; said second end portion of said trolley bracket including said reinforcing means.

12. The trolley bracket assembly of claim 11 wherein said trolley bracket includes an aperture adjacent said reinforcing means; said chain pad extending through said aperture and adjacent and into abutment with said reinforcing means.

13. The trolley bracket assembly of claim 12 wherein said reinforcing means includes a reinforcing member extending parallel to said chain pad, said reinforcing member being similar in size and covering one surface of said chain pad.

14. In a trolley bracket adapted for use with overhead conveyors, the trolley bracket being elongated and including a first end portion having means for supporting a trolley wheel thereon, a second end portion having a chain support for supporting the link of a conveyor chain for moving said bracket along a support when a trolley wheel is attached, and a connecting portion connecting said first and second end portions, said second end portion having an aperture therethrough for securing said bracket to a bracket attachment or another of said brackets; the improvement comprising:
a trolley bracket stamped from sheet metal, having a generally planar area at said second end of said bracket, and including at least one chain pad extending from said bracket second end portion and having at least one chain link engaging surface extending transverse to the direction of elongation of said bracket, said chain pad extending outwardly of said planar portion for supporting a chain link when mounted on said bracket; a bracket attachment for spacing a pair of said brackets apart when assembled in an overhead conveyor; reinforcement means on said bracket attachment extending into abutment with a portion of said chain pad opposite to said chain link engaging surface for supporting said chain pad and resisting and preventing its bending when under load; means for securing said bracket attachment to said bracket.

15. In a trolley bracket adapted for use with overhead conveyors, the trolley bracket being elongated and including a first end portion having means for supporting a trolley wheel thereon, a second end portion having a chain support for supporting the link of a conveyor chain for moving said bracket along a support when a trolley wheel is attached, and a connecting portion connecting said first and second end portions, said second end portion having an aperture therethrough for securing said bracket to a bracket attachment or another of said brackets; the improvement comprising:
said trolley bracket being formed from sheet metal, having a generally planar portion intermediate its side edges and including at least one chain pad extending transverse to the direction of elongation of said bracket, said chain pad extending outwardly of said planar intermediate portion on said second end portion and having a chain link support surface generally perpendicular to said planar bracket portion for supporting a chain link when mounted on said bracket; a separate bracket attachment for spacing a pair of said brackets apart when assembled in an overhead conveyor, said bracket attachment including a generally planar reinforcing member extending therefrom and supporting a portion of said chain pad at a position spaced inwardly of said side edges of said bracket, said reinforcing member located in a plane generally perpendicular to the plane of said planar portion of said bracket and extending away from said chain link support surface whereby said chain pad resists and is prevented from being out of its support position under load.

16. The improved trolley bracket of claim 15 wherein said reinforcing member is perpendicular to said chain link support surface.

17. In a trolley bracket adapted for use with overhead conveyors, the trolley bracket being elongated and including a first end portion having means for supporting a trolley wheel thereon, a second end portion having a chain support for supporting the link of a conveyor chain for moving said bracket along a support when a trolley wheel is attached, and a connecting portion connecting said first and second end portions, said second end portion having an aperture therethrough for securing said bracket to a bracket attachment or another of said brackets; the improvement comprising:
said trolley bracket being formed from sheet metal, having a generally planar portion intermediate its side edges and including at least one chain pad extending transverse to the direction of elongation of said bracket, said chain pad extending outwardly of said planar intermediate portion on said second end portion and having a chain link support surface generally perpendicular to said planar bracket portion for supporting a chain link when mounted on said bracket; a generally planar reinforcing member supporting a portion of said chain pad at a position spaced inwardly of said side edges of said bracket, said reinforcing member located in a plane generally perpendicular to the plane of said planar portion of said bracket and extending away from said chain link support surface whereby said chain pad resists and is prevented from bending out of its support position under load; said reinforcing member being perpendicular to said chain link support surface; said reinforcing member being bent from said bracket sheet metal, being formed in one piece with said bracket and chain pad, and extending continuously from the innermost edge of said chain pad to the bottom edge of said second bracket portion and merging with said planar second bracket end portion.

18. The improved trolley bracket of claim 17 including a second one of said chain pads spaced from the first of said chain pads, having a chain link-engaging surface aligned with the like surface of said first chain pad; and a second reinforcing member bent from said bracket sheet metal, formed in one piece with said bracket and second chain pad, and extending continuously from the innermost edge of said second chain pad to said bottom edge of said second bracket portion, said two reinforcing members being parallel and spaced across said bracket from one another; said first and second chain pads providing support for the lower edge of a chain link when mounted on said bracket; means spaced from said first and second chain pads in the direction of elongation of said bracket for supporting the upper edge of a chain link.

19. In a chain bracket assembly for attachment to a chain for use in overhead or other conveyors comprising a chain bracket, engaging means for engagement with a link of a conveyor chain to move said bracket assembly with said conveyor chain, and a bracket attachment engaged with said chain bracket for spacing at least portions of a pair of said brackets apart when assembled in a conveyor, the improvement comprising:

said engaging means including at least one chain pad having at least one chain link engaging surface on one of said chain bracket and bracket attachment extending generally transverse and across and outwardly of said chain bracket; the other of said chain bracket and bracket attachment including reinforcement means extending into abutment with a portion of said chain pad opposite to said chain link engaging surface for supporting said chain pad and preventing its movement under load; and means for securing said bracket attachment to said chain bracket.

20. The chain bracket assembly of claim 19 wherein said chain bracket includes said chain pad; said bracket attachment including said reinforcing means.

21. The chain bracket assembly of claim 20 wherein said chain bracket includes a generally planar portion which includes said chain pad; said reinforcing means including a reinforcing member extending generally perpendicularly to said generally planar portion of said chain bracket.

22. The chain bracket assembly of claim 21 wherein said bracket attachment is stamped from sheet metal, said reinforcing member being bent out of the plane of said sheet metal and engaging said chain pad.

23. The chain bracket assembly of claim 22 wherein said reinforcing member extends perpendicularly to said chain pad.

24. The chain bracket assembly of claim 20 wherein said bracket attachment is stamped from sheet metal, said reinforcing means including an elongated, reinforcing member offset from said bracket attachment sheet metal by a distance greater than the thickness of said chain bracket, said reinforcing member being formed in one piece with said bracket attachment and extending over an edge of said chain bracket into engagement with said chain pad.

25. The chain bracket assembly of claim 19 including at least a pair of said chain pads having chain link engaging surfaces aligned with one another; said reinforcing means engaging the sides of said chain pads opposite said chain link engaging surfaces.

26. The chain bracket assembly of claim 25 including a second pair of chain pads having chain link engaging surfaces aligned with one another and facing the chain link engaging surfaces of said first mentioned pair of chain pads, said first and second pairs of chain pads spaced apart and defining a chain link receiving space therebetween; reinforcing means for supporting said second pair of chain pads extending from one of said chain bracket and said bracket attachment to prevent said chain pads of said second pair from bending under load.

27. In a chain bracket assembly for attachment to a chain for use in overhead or other conveyors comprising a chain bracket, engaging means for engagement with a link of a conveyor chain to move said bracket assembly with said conveyor chain, and a bracket attachment engaged with said chain bracket, the improvement comprising:

said engaging means including at least one chain pad on one of said chain bracket and bracket attachment extending generally transverse and across and outwardly of said chain bracket; the other of said chain bracket and bracket attachment including reinforcement means extending into abutment with said chain pad for supporting said chain pad and preventing its movement under load; and means for securing said bracket attachment to said chain bracket; said chain bracket including said chain pad; said bracket attachment including said reinforcing means; said chain bracket including a generally planar portion which includes said chain pad; said reinforcing means including a reinforcing member extending generally perpendicularly to said generally planar portion of said chain bracket; said bracket attachment being stamped from sheet metal, said reinforcing member being bent out of the plane of said sheet metal and engaging said chain pad; an opening in said chain bracket adjacent said chain pad; said reinforcing member extending through said opening and into abutment with said chain pad.

28. In a chain bracket assembly for attachment to a chain for use in overhead or other conveyors comprising a chain bracket, engaging means for engagement with a link of a conveyor chain to move said bracket assembly with said conveyor chain, and a bracket attachment engaged with said chain bracket, the improvement comprising:

said engaging means including at least one chain pad on one of said chain bracket and bracket attachment extending generally transverse and across and outwardly of said chain bracket; the other of said chain bracket and bracket attachment including reinforcement means extending into abutment with said chain pad for supporting said chain pad and preventing its movement under load; and means for securing said bracket attachment to said chain bracket; said chain bracket including said chain pad; said bracket attachment including said reinforcing means; said bracket attachment being stamped from sheet metal, said reinforcing means including an elongated, reinforcing member offset from said bracket attachment sheet metal by a distance greater than the thickness of said chain bracket, said reinforcing member being formed in one piece with said bracket attachment and extending over an edge of said chain bracket into engagement with said chain pad; said chain pad being adjacent the end edge of said chain bracket; said reinforcing member being parallel to said bracket attachment and to the said chain bracket, perpendicular to said chain pad, and extending over said end edge of said chain bracket.

29. In a chain bracket assembly for attachment to a chain for use in overhead or other conveyors comprising a chain bracket, engaging means for engagement with a link of a conveyor chain to move said bracket assembly with said conveyor chain, and a bracket attachment engaged with said chain bracket, the improvement comprising:

said engaging means including at least one chain pad on one of said chain bracket and bracket attachment extending generally transverse and across and outwardly of said chain bracket; the other of said chain bracket and bracket attachment including reinforcement means extending into abutment with said chain pad for supporting said chain pad and preventing its movement under load; and means for securing said bracket attachment to said chain bracket; said bracket attachment including said chain pad; said chain bracket including said reinforcing means.

30. The chain bracket assembly of claim 29 wherein said chain bracket includes an aperture adjacent said reinforcing means; said chain pad extending through said aperture and adjacent and into abutment with said reinforcing means.

31. In a chain bracket for attachment to a chain adapted for use with overhead or other conveyors, the chain bracket including an end portion having a chain support for engaging the link of a conveyor chain for moving said bracket with the chain, said chain bracket end portion having means for securing said bracket to a bracket attachment or another of said brackets; the improvement comprising:

said chain bracket being formed from sheet metal, having a generally planar portion intermediate its side edges and including at least one chain pad extending transverse across said bracket, said chain pad extending outwardly of said planar intermediate portion on said chain bracket end portion and having a chain link support surface generally perpendicular to said planar bracket portion for supporting a chain link when mounted on said bracket; a separate bracket attachment for spacing a pair of said brackets apart when assembled in an overhead conveyor, said bracket attachment including a generally planar reinforcing member extending therefrom and supporting a portion of said chain pad at a position spaced inwardly of said side edges of said bracket, said reinforcing member located in a plane generally perpendicular to the plane of said planar portion of said bracket and extending away from said chain link support surface whereby said chain pad resists and is prevented from bending out of its support position under load.

32. The improved chain bracket of claim 31 wherein said reinforcing member is perpendicular to said chain link support surface.

33. In a chain bracket for attachment to a chain adapted for use with overhead or other conveyors, the chain bracket including an end portion having a chain support for engaging the link of a conveyor chain for moving said bracket with the chain, said chain bracket end portion having means for securing said bracket to a bracket attachment or another of said brackets; the improvement comprising:

said chain bracket being formed from sheet metal, having a generally planar portion intermediate its side edges and including at least one chain pad extending transverse across said bracket, said chain pad extending outwardly of said planar intermediate portion on said chain bracket end portion and having a chain link support surface generally perpendicular to said planar bracket portion for supporting a chain link when mounted on said bracket; a generally planar reinforcing member supporting a portion of said chain pad at a position spaced inwardly of said side edges of said bracket, said reinforcing member located in a plane generally perpendicular to the plane of said planar portion of said bracket and extending away from said chain link support surface whereby said chain pad resists and is prevented from bending out of its support position under load; said reinforcing member being perpendicular to said chain link support surface; said reinforcing member being bent from said bracket sheet metal, being formed in one piece with said bracket and chain pad, and extending continuously from the innermost edge of said chain pad to the edge of said chain bracket end portion and merging with said planar bracket end portion.

34. The improved chain bracket of claim 33 including a second one of said chain pads spaced from the first of said chain pads, having a chain link engaging surface aligned with the like surface of said first chain pad; and a second reinforcing member bent from said bracket sheet metal, formed in one piece with said bracket and second chain pad, and extending continuously from the innermost edge of said second chain pad to said edge of said chain bracket end portion, said two reinforcing members being parallel and spaced across said bracket from one another; said first and second chain pads providing support for the lower edge of a chain link when mounted on said bracket; means spaced from said first and second chain pads for supporting the upper edge of a chain link.

* * * * *

UNITED STATES PATENT AND TRADEMARK OFFICE
CERTIFICATE OF CORRECTION

PATENT NO. : 4,210,238
DATED : July 1, 1980
INVENTOR(S) : Charles C. Frost et al.

It is certified that error appears in the above-identified patent and that said Letters Patent are hereby corrected as shown below:

Column 4, line 22:
"downwwardly" should be --downwardly--

Column 8, line 16:
"perpendiculadr" should be --perpendicular--

Column 8, line 61, Claim 1:
"elongaed" should be --elongated--

Column 12, line 7, Claim 15:
"being" should be --bending--

Signed and Sealed this

Eleventh Day of November 1980

[SEAL]

Attest:

SIDNEY A. DIAMOND

Attesting Officer

Commissioner of Patents and Trademarks